United States Patent
Fengler

(10) Patent No.: US 11,165,569 B2
(45) Date of Patent: Nov. 2, 2021

(54) METHOD AND DEVICE FOR SECURELY OPERATING A FIELD DEVICE

(71) Applicant: ABB Schweiz AG, Baden (CH)

(72) Inventor: Frank Fengler, Minden (DE)

(73) Assignee: ABB SCHWEIZ AG, Baden (CH)

( * ) Notice: Subject to any disclaimer, the term of this patent is extended or adjusted under 35 U.S.C. 154(b) by 272 days.

(21) Appl. No.: 16/438,529

(22) Filed: Jun. 12, 2019

(65) Prior Publication Data
US 2019/0379535 A1   Dec. 12, 2019

(30) Foreign Application Priority Data
Jun. 12, 2018   (EP) .................................. 18177416

(51) Int. Cl.
| H04L 29/06 | (2006.01) |
| H04L 9/08 | (2006.01) |
| G06F 21/34 | (2013.01) |
| H04L 29/08 | (2006.01) |
| G16Y 30/10 | (2020.01) |

(52) U.S. Cl.
CPC ............ *H04L 9/0838* (2013.01); *G06F 21/34* (2013.01); *G16Y 30/10* (2020.01); *H04L 9/0825* (2013.01); *H04L 9/0869* (2013.01); *H04L 9/0875* (2013.01); *H04L 63/0492* (2013.01); *H04L 67/12* (2013.01)

(58) Field of Classification Search
CPC ... H04L 9/0825; H04L 9/0838; H04L 9/0869; H04L 9/0875; H04L 63/0492; H04L 67/12; G16Y 30/10; G06F 21/34
See application file for complete search history.

(56) References Cited

U.S. PATENT DOCUMENTS

| 9,548,984 | B2 | 1/2017 | Steffen et al. |
| 9,710,984 | B2 | 7/2017 | Tilman et al. |
| 2013/0031360 | A1 | 1/2013 | Gerd et al. |
| 2015/0270977 | A1* | 9/2015 | Martins ..................... H04L 9/30 380/30 |
| 2017/0154333 | A1* | 6/2017 | Gleeson .............. G06Q 20/027 |
| 2017/0180355 | A1* | 6/2017 | Enns ................... H04W 12/062 |
| 2021/0203491 | A1* | 7/2021 | Wei ......................... H04L 9/321 |

FOREIGN PATENT DOCUMENTS

| DE | 102011108003 A1 | 1/2013 |
| DE | 102012214018 B3 | 2/2014 |
| DE | 102014112611 A1 | 3/2016 |
| EP | 1403749 A1 | 3/2004 |

* cited by examiner

*Primary Examiner* — Thaddeus J Plecha
(74) *Attorney, Agent, or Firm* — Leydig, Voit & Mayer, Ltd.

(57) ABSTRACT

A device for securely operating a field device includes: the field device, which includes at least one human-machine interface having a display device and a keyboard for operating the field device, and a communications interface for connecting a local operating device having a secure connection to a trusted server via a communications network, the secure connection being based upon an authentication feature of a local operator. The field device during use as intended does not have a secure connection to a network for process control. The field device provides and stores a query key. The field device is connected, at least logically, to the local operating device. The trusted server has a private key for providing a signed response key. The signed response key is based upon the query key.

8 Claims, 1 Drawing Sheet

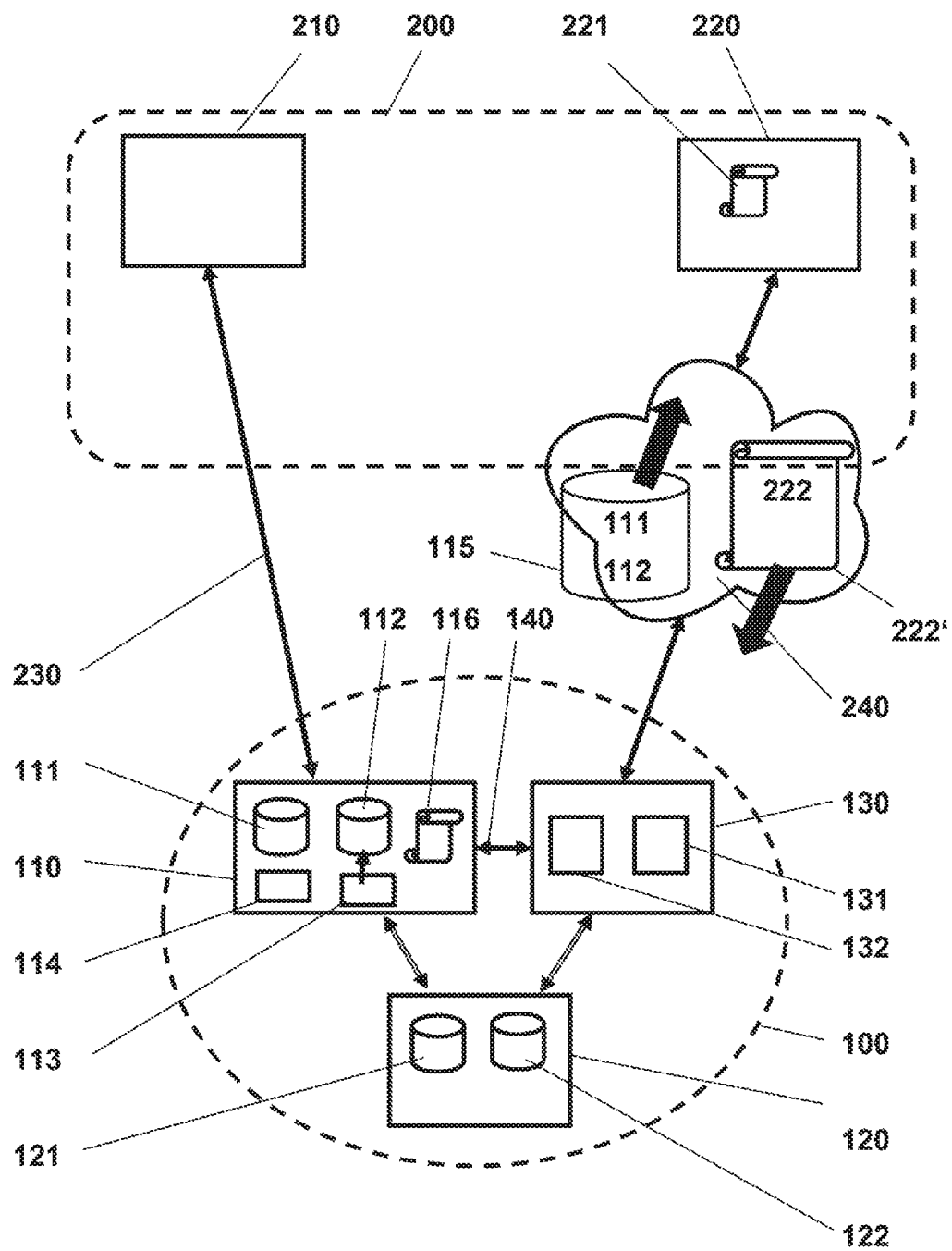

METHOD AND DEVICE FOR SECURELY OPERATING A FIELD DEVICE

CROSS-REFERENCE TO PRIOR APPLICATION

Priority is claimed to European Patent Application No. EP 18177416.7, filed on Jun. 12, 2018, the entire disclosure of which is hereby incorporated by reference herein.

FIELD

The invention relates to a method and a device for securely operating a field device in process automation. This includes, in particular, but not exclusively, measuring transducers which convert a physical process variable, such as temperature, pressure, flow rate, level, pH or the like, into an electrical variable, such as current, voltage, frequency, pulse sequence or the like, and actuators which convert an electrical variable into a physical variable, such as the position of flaps or valves for flow-rate limiting.

BACKGROUND

Such field devices have at least one human-machine interface comprising a display device and a keyboard suitable for operating the field device. In addition, such a field device has a communications interface for connecting a local operating device. Suitable local operating devices are, in particular, but not exclusively, portable computers, such as notebooks or tablet computers, and smartphones which, in particular, but not exclusively, communicate wirelessly via USB or wirelessly via NFC or Bluetooth with the field device.

Such field devices are usually integrated into a network for process control. Via this network, the electrical variables of measured values and/or control values are transmitted between the respective field device and a process control device. For the analog transmission of the electrical variables of measured values and/or control values, the 0/4 . . . 20 mA current loop is known and implemented as an industry standard. In addition, digital transmission systems, such as HART, Profibus, FoundationFieldbus, are known for transmitting the electrical variables of measured values and/or control values. Disadvantageously, these transmission systems do not meet the requirements of "functional security" according to the international standards IEC 61508 and IEC 61511.

The operation of such field devices is protected from unauthorized use. For this purpose, entry of a valid user identification and a valid password via the keyboard of the human-machine interface of the field device or of the local operating device is provided, at least in case of a change of the settings of the field device.

Another security feature of such field devices consists in the operation of the field device being locked after a predetermined number of erroneous entries of combinations of user identification and password. No adjustments can be made to the field device while the lock exists. This lock can only be canceled by a predetermined procedure which must be performed directly on the field device by an authorized user by means of a control element provided for this purpose—for example, the RESET button. For security reasons, the field device is reset to the factory settings in the case of a RESET; the set configuration of the field device is thus, disadvantageously, lost. Resetting the field device during ongoing process operation with loss of configuration is unacceptable for the operator of a process installation comprising this field device.

EP 1403749 A1 discloses a process control system which consists of several spatially distributed, networked network members, between which data are exchanged using secure communication, wherein the integrity of the data is based upon the exchange of certificates. The process control system has a central certification authority, which is an integral component of the process control system and allocates and distributes the certificates.

In addition, DE 10 2011 108 003 A1 discloses a process control system consisting of several spatially distributed, networked network members with secure communication between the network members, wherein the integrity of the communication is based upon the exchange of certificates, wherein the process control system has a central certification authority, which is an integral component of the process control system and allocates and distributes the certificates. In this case, the existing reporting and protocol system of the process control system is designed to monitor and log the functions of key management using the process control system by capturing and storing the events in the form of system messages.

However, the known technical solutions presuppose a permanently existing communications link between the devices, with secure communication.

Also known from DE 10 2012 214 018 B3 is a method for authorizing a user by means of a portable communications device. In this case, first information for identifying the field device is detected by the portable communications device. The portable communications device transmits the first information and second information for identifying the portable communications device or its user to a system. The system determines first access information as a function of the first information and the second information, and transmits the first information to the portable communications device. The portable communications device transmits the second information and the first access information to the field device. The field device determines a second access information as a function of the second information and checks the first access information against the second access information. If the first access information and the second access information match, access to the field device is granted.

A disadvantage of this solution based upon a symmetric encryption method is the high effort needed. The system-side effort is characterized by the number of individual field-device keys to be managed. The computational complexity for processing the access information is high in all field devices.

Lastly, DE 10 2014 112 611 A1 discloses a method for unidirectional or bidirectional authentication of at least one first unit—in particular, a mobile device—on at least one second unit—in particular, a field device—within an installation—in particular, in the field of process automation technology. The first and second units are provided with security policies and, based upon the rules thereof, activation codes are generated. In this case, the security policy of the second units includes each member of the group of the first units which is potentially involved in the method.

Disadvantageously, it is accepted in this case that each newly joining first unit must be entered into the security policies of all second units of the installation. This is already a considerable effort for medium-sized installations and is also error-prone, so that the intended secure authentication of the participant is undermined. In addition, the units involved negotiate their authentication amongst each other without verification by a superordinate security device. This is generally regarded as a security risk, since the connection can be disturbed by a man-in-the-middle attack.

SUMMARY

In an embodiment, the present invention provides a device for securely operating a field device, the device comprising: the field device, comprising at least one human-machine interface comprising a display device and a keyboard configured to operate the field device, and a communications interface configured to connect a local operating device having a secure connection to a trusted server via a communications network, the secure connection being based upon an authentication feature of a local operator, wherein the field device during use as intended does not have a secure connection to a network for process control, wherein the field device is configured to provide and store a query key, wherein the field device is connected, at least logically, to the local operating device, wherein the trusted server has a private key configured to provide a signed response key, and wherein the signed response key is based upon the query key.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

The single FIGURE shows a field device 110 connected to a process controller 210 via a network 230 for process control.

DETAILED DESCRIPTION

The invention is therefore based upon the aim of unlocking a field device for process automation—which, during use as intended, does not have a secure connection to a network of process control—in an authenticated manner, with little effort.

The invention assumes a field device having at least one human-machine interface comprising a display device and a keyboard suitable for operating the field device, and a communications interface for connecting a local operating device, wherein the field device during use as intended does not have a secure connection to a network for process control. For security reasons, the operation of the field device is locked after a predetermined number of erroneous entries of combinations of user identification and password. In addition, the field device has a separate control element for unlocking. Lastly, the invention assumes that the local operator is authenticated by a user identification and a password.

The essence of the invention consists in generating in the field device a unique random query key, which is known to the field device, and transmitting it with the aid of a local operating device using the authentication of a local operator via a secure connection to a trusted server and receiving it back, signed with the private key of the trusted server using an asymmetric encryption method, from this trusted server as signed response key.

For authenticated unlocking of the field device, the field device knows the public key of the trusted server and verifies the response key with the query key.

The field device has, in terms of the device, a unique identification feature and a means for generating and outputting a random number upon request, which together serve as query key.

In addition, a local operating device is provided which is connected to the communications interface for connecting a local operating device of the field device. The local operating device is connected at least temporarily via a secure communications network to a trusted server, wherein the secure connection is authenticated via the communications network with the authentication features of the local operator. In addition, the local operating device has means for retrieving the unique query key consisting of the identification feature and the random number from the field device via the local connection between the field device and the local operating device, and for transmitting the query key to the trusted server via the secure connection.

The trusted server has a private key and is designed to receive the transmitted query key via the connection secured with the authentication features of the local operator, to sign it, and to return it as a signed message to the local operating device via the secure connection.

The field device is designed to extract the response key from the signed message of the trusted server using the public key and to compare it with the query key. The field device is further designed, in the case of identity of the response key with the query key, to execute the predetermined procedure for authenticated unlocking of the local operation of the field device, while maintaining the existing configuration.

The transmission of the response key using an asymmetric encryption method, in which the central device—here, the trusted server—is equipped with a private key, and a plurality of decentralized devices—here, the field devices—are equipped with an associated public key, has the advantage that, irrespective of the number of field devices, only one key, viz., the private key, has to be kept available in the trusted server, so that the effort for key management in the central device remains low.

According to the method, the aim is achieved by the following steps. In a first step, a local operating device is connected, at least logically, to the field device.

In a second step, a secure connection between the local operating device and a trusted server is established using the authentication features of the local operator.

In a third step, a query key is generated in the field device. To this end, upon request, a random number is generated. The request is initiated by a local operator directly at the field device. The query key is formed from the random number and the unique identification feature of the field device.

In a fourth step, the query key is sent to the trusted server via the local operating device and the secure connection.

In a fifth step, a response is formed from the query key by the trusted server by signing and is provided as a signed response key.

In a sixth step, the signed response key is transmitted via the secure connection between the trusted server and the local operating device to the local operating device, and further via the local connection to the field device.

In a seventh step, the response key is extracted from the signed response key using the public key and is compared to the query key.

When the identification and random number of the query key in the response key match, in an eighth step, the predetermined procedure for authenticated unlocking of the local operation of the field device is enabled, while maintaining the existing configuration in the field device.

Lastly, in a ninth step, the field device is unlocked for operation. In doing so, the existing configuration is retained. The field device is then enabled for operation via the keyboard of the human-machine interface of the field device or via the keyboard of the local operating device.

As a result, the field device can be operated fully again while maintaining the existing configuration.

Advantageously, separate equipment of the field device for establishing and maintaining a secure connection to a trusted server can be dispensed with.

A particular advantage of the solution according to the invention can be seen in the fact that it can be retrofitted with little effort in existing process installations having a plurality of field devices, without interfering in the existing installation topology.

The single FIGURE shows a field device 110 connected to a process controller 210 via a network 230 for process control. Suitable as process controller 210 is any device which is designed to influence a technical process in a targeted manner and is formed—by way of example, but not exclusively—as a regulator, as a programmable logic controller, or as a process control system. The network 230 for process control includes all elements, including distributors, routers, remote I/O and the like, which serve to exchange data between the process controller 210 and the field device 110. At least process data are exchanged between the process controller 210 and the field device 110 via the network 230 for process control. In the simplest case, a 0/4 . . . 20 mA current loop is suitable for this purpose. Moreover, diagnostic data, status messages, and the like may be exchanged between the process controller 210 and the field device 110—for example, via the HART protocol. Furthermore, the network 230 for process control can be formed by fieldbuses known per se. The network 230 for process control, however, does not meet the requirements of "functional security" according to the international standards IEC 61508 and IEC61511.

The field device 110 has a human-machine interface 114 comprising a display device and a keyboard suitable for at least rudimentary operation of the field device 110. For extended operation, the field device 110 is equipped with a communications interface for connecting a local operating device 130.

In the local area 100 of the field device 110 is provided, at least temporarily, a local operating device 130, which is connected, via a local connection 140, to the communications interface for connecting a local operating device 130 of the field device 110. Suitable local operating devices 130 are—in particular, but not exclusively—portable computers, such as notebooks or tablet computers, and smartphones which—in particular, but not exclusively—communicate wirelessly via USB or wirelessly via infrared, NFC, or Bluetooth with the field device 110. For local operation of the field device 110, an operator 120 is nevertheless situated in the local area 100 within reach of the field device 110 and the local operating device 130. The local area 100 is limited by the reach of the operator 120. Everything beyond this reach belongs to a remote area 200.

The local operating device 130 is equipped at least with a keyboard 131 and a display 132. In this case, a touch-sensitive display 132 can be provided, on which a keyboard 131 is shown and held available for operation.

The operation of the field device 110 is protected from unauthorized use. For this purpose, entry of a valid user identification and a valid password via the keyboard of the human-machine interface of the field device 110 or of the local operating device 130 is provided, at least in case of a change in the settings of the field device 110. The access data 121 (user ID and password) of the field device 110 are known to the operator 120.

The field device 110 has a unique identification feature 111 which can be formed from the serial number, the manufacturer identifier, and/or a specific identifier within the process control installation.

In addition, the field device 110 is equipped with a random number generator 113 which outputs a random number 112 upon request.

For authenticated unlocking of the field device 110, the generation of a random number 112 in the field device 110 by the random number generator 113 is requested by means of a command, and a query key 115 generated which is known to the field device 110. This query key 115 is formed from the random number 112 and the unique identification feature 111. In the simplest embodiment, the command is triggered by operating a button of the human-machine interface 114 of the field device 110. In another embodiment, the command may be initiated via the keyboard 131 of the local operating device 130.

The operator 120 in the local area 100 is authorized for authenticated access to a trusted server 220 in the remote area 200. An authentication feature 122 is assigned to the operator 120 for this purpose. This authentication feature 122 is typically formed by a combination of user identification and password. The trusted server 220 is equipped with a signature in the form of a private key 221.

With the authentication feature 122 of the operator 120, a secure connection between the local operating device 130 in the local area 100 and the trusted server 220 in the remote area 200 is established via a communications network 240 independent of the network 230 of the process control. In a preferred embodiment, the internet is the communications network 240.

In an advantageous embodiment of the invention, the trusted server 220 checks the authorization of the operator 120 for unlocking the field device 110. For this purpose, the trusted server 220 has a memory, in which the authentication features 122 of all operators 120 are stored. In addition, the trusted server 220 has a further memory, in which the unique identification features 111 of the field devices 110 are stored.

Via the secure connection of the communications network 240, the query key 115 is transmitted from the field device 110 via the local operating device 130 to the trusted server 220. In the trusted server 220, the response, including query key 115, is signed with the private key 221 of the trusted server 220 and transmitted as signed response key 222' via the secure connection of the communications network 240 back to the field device 110.

In an advantageous embodiment of the invention, the validity of the query key 115 is checked using the trusted server 220. The query key 115 is valid when the identification feature 111 is stored in the trusted server 220, and, optionally, the user is authorized.

The field device 110 receives the signed response key 222' from the trusted server 220 and extracts the response key 222 from the signed response key 222' using a public key 116.

When the query key 115 and the response key 222 match, the predetermined procedure for authenticated unlocking of the local operation of the field device 110 is enabled, while maintaining the existing configuration in the field device 110.

Lastly, the field device 110 is unlocked for operation. In doing so, the existing configuration of the field device 110 is retained. The field device 110 is then enabled for operation via the keyboard of the human-machine interface 114 of the field device 110 or via the keyboard 131 of the local operating device 130.

As a result, the field device 110 is fully operable again, while maintaining the existing configuration.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Local area
110 Field device
111 Identification feature
112' Random number
113 Random number generator
114 Human-machine interface
115 Query key
116 Public key
120 Operator
121 Access data
122 Authentication feature of the local operator
130 Operating device
131 Keyboard
132 Display
140 Local connection
200 Remote area
210 Process controller
220 Trusted server
221 Private key
222 Response key
222' Signed response key
230 Network of process control
240 Communications network

What is claimed is:

1. A field device, comprising:
at least one human-machine interfaces comprising:
  a display device; and
  a keyboard configured to operate the field device, and
a communications interface configured to connect a local operating device having a secure connection to a trusted server via a communications network, the secure connection being based upon an authentication feature of a local operator,
wherein the field device during use as intended does not have a secure connection to a network for process control,
wherein the field device is configured to provide and store a query key,
wherein the field device is connected, at least logically, to the local operating device,
wherein the trusted server has a private key configured to provide a signed response key,
wherein the signed response key is based upon the query key, and
wherein the field device receives the signed response key from the trusted server.

2. The field device according to claim 1, further comprising:
a unique identification feature.

3. The field device according to claim 1, further comprising:
a random number generator.

4. The field device according to claim 3, wherein the random number generator is configured to provide a random number upon request.

5. A method for securely operating a field device having at least one human-machine interface comprising a display device and a keyboard configured to operate the field device, and a communications interface configured to connect a local operating device, wherein the field device during use as intended does not have a secure connection to a network for process control, the method comprising:
connecting the field device, at least logically, to the local operating device via a local connection;
establishing a secure connection between the local operating device and a trusted server using authentication features of a local operator;
generating a query key in the field device;
transmitting the query key via the local operating device and the secure connection to the trusted server;
forming a signed response key by signing the query key with a private key of the trusted server;
transmitting the signed response key via the secure connection between the trusted server and the local operating device to the local operating device, and further via the local connection to the field device;
extracting, in the field device, using a public key, the response key from the signed response key;
comparing the response key to the query key; and
enabling a predetermined procedure for authenticated unlocking of a local operation of the field device when the response key matches the query key, while maintaining an existing configuration in the field device.

6. The method according to claim 5, wherein the query key is formed from a unique identification feature of the field device and a random number.

7. The method according to claim 5, wherein authorization of the operator for unlocking the field device is checked using the trusted server.

8. The method according to claim 5, wherein validity of the query key is checked using the trusted server.

\* \* \* \* \*